United States Patent
Sugawara et al.

(10) Patent No.: US 8,879,192 B1
(45) Date of Patent: Nov. 4, 2014

(54) INFORMATION RECORDING DEVICE AND INFORMATION RECORDING METHOD

(71) Applicant: Kabushiki Kaisha Toshiba, Tokyo (JP)

(72) Inventors: Nobuhiro Sugawara, Kanagawa (JP); Hidekazu Masuyama, Kanagawa (JP); Hironori Kanno, Tokyo (JP); Kenji Ogawa, Kanagawa (JP); Tetsuo Kuribayashi, Kanagawa (JP); Seiji Toda, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/189,919

(22) Filed: Feb. 25, 2014

(30) Foreign Application Priority Data

Aug. 6, 2013 (JP) .................. 2013-163670

(51) Int. Cl.
*G11B 5/02* (2006.01)
*G11B 20/12* (2006.01)
(52) U.S. Cl.
CPC .... *G11B 20/1217* (2013.01); *G11B 2020/1241* (2013.01)
USPC .......................................................... 360/55
(58) Field of Classification Search
None
See application file for complete search history.

(56) References Cited

U.S. PATENT DOCUMENTS

| | | | | |
|---|---|---|---|---|
| 5,394,532 A * | 2/1995 | Belsan | ........................ | 711/114 |
| 5,812,883 A * | 9/1998 | Rao | .............................. | 360/133 |
| 5,930,358 A * | 7/1999 | Rao | .............................. | 360/133 |
| 6,009,498 A * | 12/1999 | Kumasawa et al. | ............ | 360/48 |
| 6,101,574 A * | 8/2000 | Kumasawa et al. | ........... | 711/113 |
| 7,035,994 B2 * | 4/2006 | Tanaka et al. | ................ | 711/217 |
| 7,088,658 B2 * | 8/2006 | Ozaki et al. | ............... | 369/53.15 |
| 7,180,841 B2 * | 2/2007 | Sasaki | ........................ | 369/53.21 |
| 7,518,966 B2 * | 4/2009 | Ishida | .......................... | 369/53.2 |
| 2001/0039648 A1 * | 11/2001 | Imamura et al. | .................. | 717/3 |

FOREIGN PATENT DOCUMENTS

JP 05-174491 7/1993
JP 3671444 4/2005

* cited by examiner

*Primary Examiner* — Thang Tran
(74) *Attorney, Agent, or Firm* — Patterson & Sheridan, LLP

(57) ABSTRACT

An information recording device includes a recording medium that includes a data area, and a controller that controls recording of data on the recording medium, wherein in response to a request for execution of formatting of the data area of the recording medium, the controller does not record data for the formatting in the data area and records format information about the formatting in a nonvolatile recording area that is different from the data area.

20 Claims, 4 Drawing Sheets

INFORMATION RECORDING DEVICE AND INFORMATION RECORDING METHOD

CROSS-REFERENCE TO RELATED APPLICATION

This application is based upon and claims the benefit of priority from Japanese Patent Application No. 2013-163670, filed Aug. 6, 2013, the entire contents of which are incorporated herein by reference.

FIELD

Embodiments described herein relate generally to an information recording device that records information and an information recording method.

BACKGROUND

In an information recording device such as a hard disk drive (HDD) and a solid state drive (SSD), an increase in recording density and storage capacity is desirable. In formatting the data area provided for recording user data in such an information recording device, processing time is increased because information is recorded in all the data areas. For example, as a response to a "Format Unit command" that conforms to the Serial Attached SCSI (SAS) standard, it is required to record predetermined data in the data area.

When such formatting is performed, the previously recorded data is invalidated. Various techniques for invalidating the recorded data are known. One of the methods for invalidating the data employs a technique that processes a CRC corresponding to the recorded data. In addition, a technique for generating a CRC based on position information of the data area is known.

DETAILED DESCRIPTION

Embodiments provide an information recording device and an information recording method that may suitably perform formatting of an area provided for recording user data therein.

In general, according to one embodiment, an information recording device includes a recording medium that includes a data area, and a controller that controls recording of data on the recording medium, wherein in response to a request for execution of formatting of the data area of the recording medium, the controller does not record data for the formatting in the data area and records format information about the formatting in a nonvolatile recording area that is different from the data area.

Hereinafter, embodiments will be described with reference to the drawings. It is to be understood that the following embodiments are not limiting and the component elements thereof may be modified in the implementation phase without departing from the spirit thereof. Moreover, various other embodiments may be implemented by appropriately combining the component elements disclosed in the following embodiments. For example, some of the component elements of the embodiments may be deleted and the component elements of different embodiments may be appropriately combined.

Figure 1:
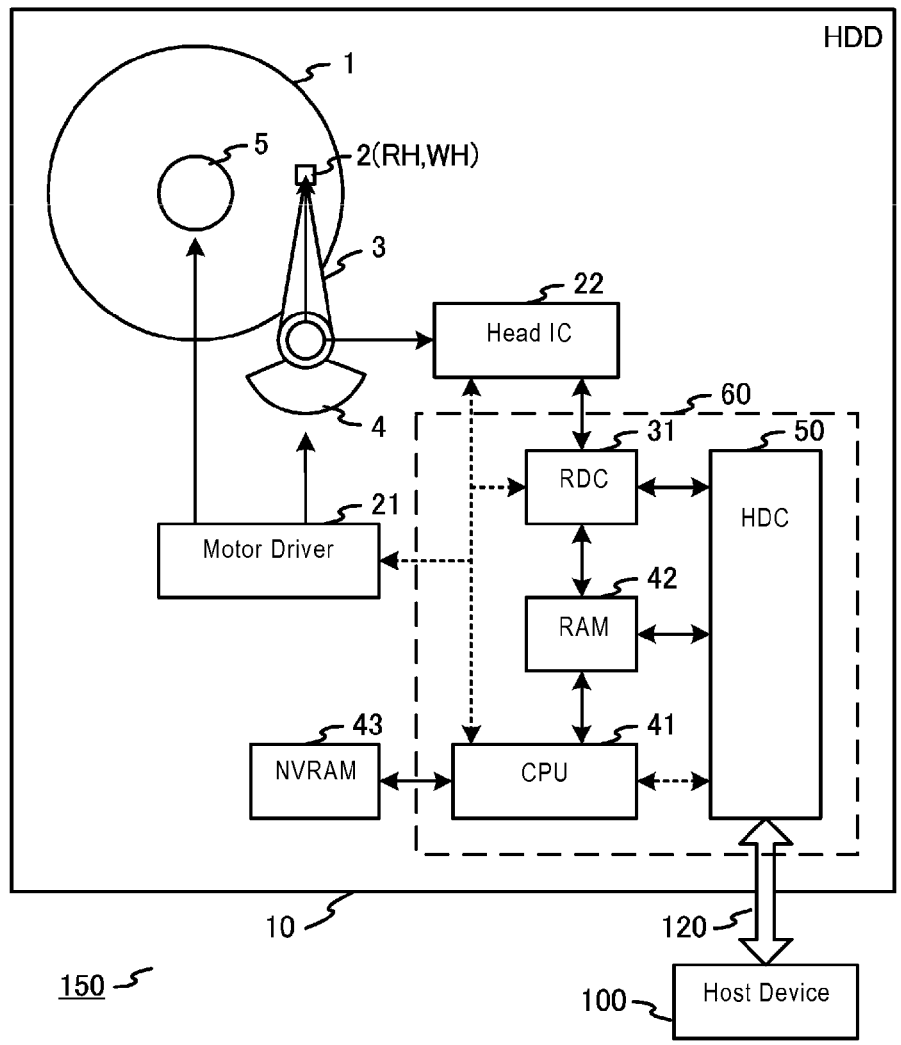
FIG. 1 is a block diagram showing a configuration of an electronic system provided with an information recording device according to an embodiment.

FIG. 1 is a block diagram showing a configuration of an electronic system 150 provided with a magnetic disk unit (e.g., a hard disk unit, hereinafter also referred to as an HDD) 10 as an information recording device according to an embodiment. The electronic system 150 includes a host device 100 and the HDD 10. A host I/F 120 connects the host device 100 and the HDD 10, and is used for transmission and reception of a command and user data between the host device 100 and the HDD 10. The host I/F 120 conforms to the Serial Advanced Technology Attachment (SATA) standard or the Serial Attached SCSI (SAS) standard. The HDD 10 is connected to the host device 100 via the host I/F 120 and functions as an information recording device of the host device 100. For example, the electronic system 150 is a personal computer or a mobile device, and the host device 100 is a chip set IC provided in the personal computer or the like.

The HDD 10 includes a head-disk assembly (HDA) provided with a magnetic disk 1, a slider 2, an arm 3, a voice coil motor (VCM) 4, and a spindle motor (SPM) 5. Moreover, the HDD 10 includes a circuit block including a motor driver 21, a head IC 22, nonvolatile memory (NVRAM) 43, and a controller 60.

The controller 60 includes a read write channel IC (hereinafter also referred to as an RDC) 31, a CPU 41, RAM 42, and a hard disk controller (HDC) 50. As the RAM 42, DRAM (SDRAM) or SRAM, which is volatile memory that may perform faster data transfer than the magnetic disk 1, is used. The NVRAM 43 is a nonvolatile recording section, and, as the NVRAM 43, a semiconductor memory such as a flash memory or a NAND memory and part of a recording area of the magnetic disk 1 are used.

The HDD 10 according to the embodiment records data on the magnetic disk 1 (executes writing) and reads data from the magnetic disk 1 (executes reading). Moreover, the HDD 10 executes formatting in accordance with a format command transmitted from the host device 100. The format command is, for example, a "Format Unit command" that conforms to the SAS standard. These processes are controlled according to a program product (firmware) that is executed in the CPU 41. The data of the program product is stored in the NVRAM 43 or the magnetic disk 1.

The magnetic disk 1 is rotated by the SPM 5. The driving of the SPM 5 is controlled by a drive current from the motor driver 21. The arm 3 and the VCM 4 form an actuator. The actuator moves (seeks) a head (not shown) installed on the slider 2 to a target position on the magnetic disk 1. That is, the actuator moves the slider 2 (more specifically, the head) mounted on the arm 3 in a radial direction on the disk 1 by the driving of the VCM 4. The driving of the VCM 4 is controlled by the drive current from the motor driver 21.

In the magnetic disk 1, a large number of cylinders (tracks) on which data is recorded are formed. Each cylinder includes a plurality of sectors. The magnetic disk 1 has a system area provided for recording management information about the operation of the HDD 10 and format information about formatting therein, and a data area provided for recording user data transmitted from the host device 100 therein. The magnetic disk 1 is formed as a recording medium. The head, whose main body is the slider 2, includes a write head WH and a read head RH that are installed on the slider. The read head RH reads the data recorded on the cylinder on the magnetic disk 1. The data to be read is servo information or user data. The write head WH writes the user data and format data in formatting on the magnetic disk 1. The write head WH is formed as a recording unit.

The head IC 22 includes a read amplifier (not shown) and a write driver (not shown). The read amplifier amplifies a read signal read by the read head RH and transmits the amplified read signal to the RDC 31. The write driver transmits a write current in accordance with write data output from the RDC 31 to the write head WH.

The controller 60 is formed as a one-chip integrated circuit including the RDC 31, the CPU 41, the RAM 42, and the HDC 50. The RDC 31 includes a read channel and a write channel (of which none is shown). The read channel decodes the read signal read by the read head RH into data (including servo information) by processing the read signal. The write channel executes signal processing on the write data from the HDC 50. The RAM 42 may be provided outside the controller 60.

The HDC 50 controls data transfer between the host device 100 and the RDC 31 by controlling the RAM 42. The HDC 50 executes data transfer control by temporarily storing the read data and the write data in the RAM 42. Moreover, the HDC 50 performs storage and reading of a program product that is executed by the CPU 41 and a device parameter, for example, by controlling the NVRAM 43. The HDC 50 is formed as an interface unit that controls transmission and reception of command and data between the host device 100 and the HDD 10.

The CPU 41 is also referred to as a microprocessor or a microcontroller. The CPU 41 executes positioning control (servo control) of the head by controlling the VCM 4 via the motor driver 21. Moreover, the CPU 41 controls, via the RDC 31, reading, writing, and formatting that are performed on the magnetic disk 1. The CPU 41 controls these processes by using the HDA and the circuit block in accordance with the program product.

Figure 2:
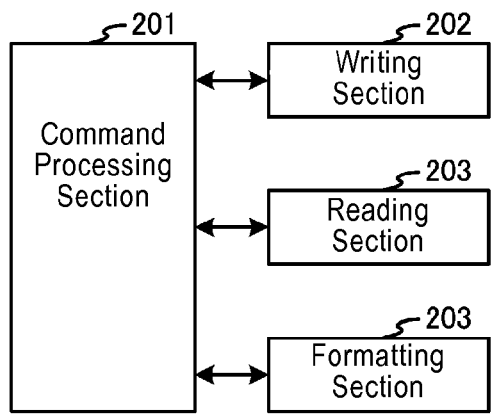
FIG. 2 is a configuration diagram for describing blocks that execute reading, writing, and formatting according to an embodiment.

Next, blocks provided in the HDD 10 according to the embodiment for executing reading, writing, and formatting will be described. FIG. 2 is a configuration diagram illustrating the blocks that execute reading, writing, and formatting according to the embodiment.

The HDD 10 includes a command processing section 201, a writing section 202, a reading section 203, and a formatting section 204. These blocks are formed by the HDA and the circuit block of the HDD 10 and the program product that is executed by the CPU 41. That is, reading, writing, and formatting according to the embodiment are executed by these blocks.

The command processing section 201 notifies the writing section 202, the reading section 203, or the formatting section 204 of a request for execution of processing according to a command transmitted from the host device 100 or processing requested in the HDD 10. The command processing section 201 transmits a response command for the host device in accordance with the information received from the writing section 202, the reading section 203, or the formatting section 204. The command processing section 201 of the embodiment notifies the formatting section 204 of a request for execution of processing according to a format command transmitted from the host device 100.

Based on the notification from the command processing section 201, the writing section 202 executes writing by which data is recorded on the magnetic disk 1 by the write head WH. The data that is recorded on the magnetic disk 1 corresponds to the write data that is output to the RDC 31 via the head IC 22. The writing includes the positioning control of the read head RH and the write head WH by the VCM 4 and the rotation control of the SPM 5. When the execution of the writing is completed, the writing section 202 notifies the command processing section 201 of the completion of processing. The data recorded in the data area of the magnetic disk 1 by the writing of the embodiment includes CRC data.

Based on the notification from the command processing section 201, the reading section 203 executes reading by which data is read from the magnetic disk 1 by the read head RH. The signal read from the magnetic disk 1 is output to the RDC 31 via the head IC 22. The reading includes the positioning control of the read head RH by the VCM 4 and the rotation control of the SPM 5. When the execution of the reading is completed, the reading section 203 notifies the command processing section 201 of the completion of processing. In the reading of the embodiment, data is read from the system area and the data area of the magnetic disk 1.

Based on the notification from the command processing section 201, the formatting section 204 executes formatting by which the state of the data area of the magnetic disk 1 is initialized (formatted). The formatting includes processing to record initialization data (format data) in the system area or the data area of the magnetic disk 1 by the write head WH and processing to record the format information in the system area of the magnetic disk 1 by the write head WH. Moreover, the formatting includes the positioning control of the read head RH and the write head WH by the VCM 4 and the rotation control of the SPM 5. When the execution of the formatting is completed, the formatting section 204 notifies the command processing section 201 of the completion of processing. The format information in the formatting of the embodiment includes format identification information (for example, the total number of execution operations of formatting, a random number corresponding to formatting in each execution operation, and the cumulative operating time of the HDD 10) based on which formatting to be executed can be identified. Incidentally, since formatting is processing by which data is recorded on the magnetic disk 1 as in writing, formatting may be configured as an example of writing.

With the information recording device and the information recording method according to the embodiment, by the above-described configuration, formatting of an area provided for recording the user data of the magnetic disk 1 therein can be suitably performed.

Figure 3:
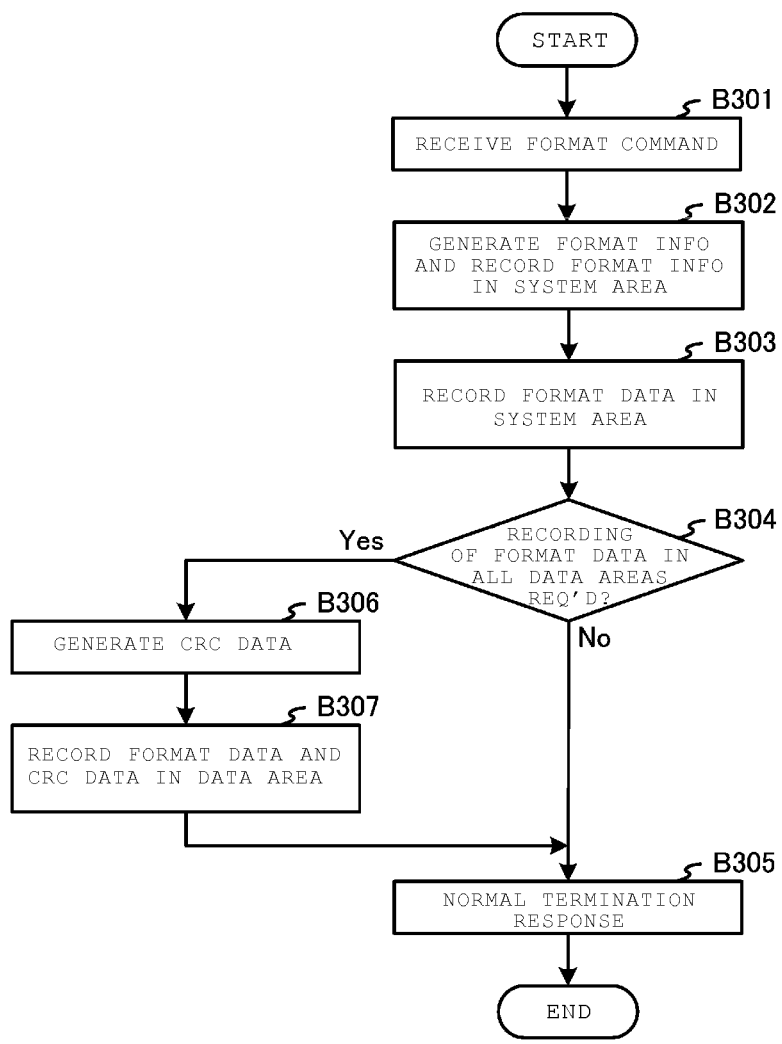
FIG. 3 is a flowchart for describing operation of formatting according to the embodiment.

Next, by using FIG. 3, operation of formatting that is executed in the HDD according to the embodiment will be described. FIG. 3 is a flowchart for describing the operation of formatting according to the embodiment.

As described above, formatting according to the embodiment is executed in response to reception of a format command from the host device 100. Formatting is executed as a result of the CPU 41 controlling the HDA and the circuit block of the HDD 10 in accordance with the program product.

During formatting, format data for initializing the state of the data area of the magnetic disk 1 is used. The format data is a pattern transmitted from the host device 100 or a predetermined pattern (for example, a pattern including only zero).

First, in response to reception of a format command from the host device 100 (B301), the command processing section 201 notifies the formatting section 204 of a request for execution of formatting. Next, the formatting section 204 generates new format information and records the generated format information in the system area of the magnetic disk 1 (B302). In other words, every time formatting is executed, the formatting section 204 updates the format identification information (the format information). Moreover, the formatting section 204 records not only the format information, but also the format data in the system area of the magnetic disk 1 (B303). Furthermore, the formatting section 204 determines from the format command whether or not the formatting requires recording the format data in all the data areas of the magnetic disk 1 (recording of the format data in all the data areas) (B304). If the formatting section 204 determines that recording of the format data in all the data areas is not required (No in B304), a normal termination command for the format command is transmitted to the host device 100 when the formatting section 204 notifies the command processing section 201 of the completion of processing (B305).

On the other hand, if the formatting section 204 determines in B304 that recording of the format data in all the data areas is required (Yes in B304), the formatting section 204 generates CRC data for each sector of all the effective data areas of the magnetic disk 1 using the format data and embeds into the CRC data the updated format identification information and a logical address (LBA) of the corresponding sector in a restorable manner by logical operation (B306). The embedding into the CRC data is carried out by a program product that is executed in the CPU 41 or by a logical operation circuit (hardware) provided in the RDC 31 or the HDC 50. Then, the formatting section 204 records, in each sector of all the effective data areas of the magnetic disk 1, the format data and the CRC data to which the updated format identification information and the LBA of the corresponding sector have been added (B307). After step B307, the normal termination command for the format command is transmitted to the host device 100 (B305).

Incidentally, instead of the procedure described above, a procedure to determine whether the format information is recorded again (updated) in the system area of the magnetic disk 1 or the format information is simply embedded in a restorable manner at the time of generation of the CRC data without updating the system area in accordance with the result of determination in B304 can also be adopted.

In this way, formatting according to the embodiment is executed. According to this formatting, when the format information and the format data are recorded in the system area, not in the data area, the time required for formatting can be greatly reduced. Moreover, since the format information is updated every time formatting is executed, the presence or absence of execution of formatting can be determined later. On the other hand, when the format data is recorded in the data area, the format identification information is added to the CRC data. Therefore, the presence or absence of execution of formatting for each sector and correctness of an LBA to be processed can be determined later with no loss of the sector format efficiency of the data area. That is, with the information recording device and the information recording method according to the embodiment, formatting of an area provided for recording the user data of the magnetic disk 1 therein can be suitably performed.

Figure 4:
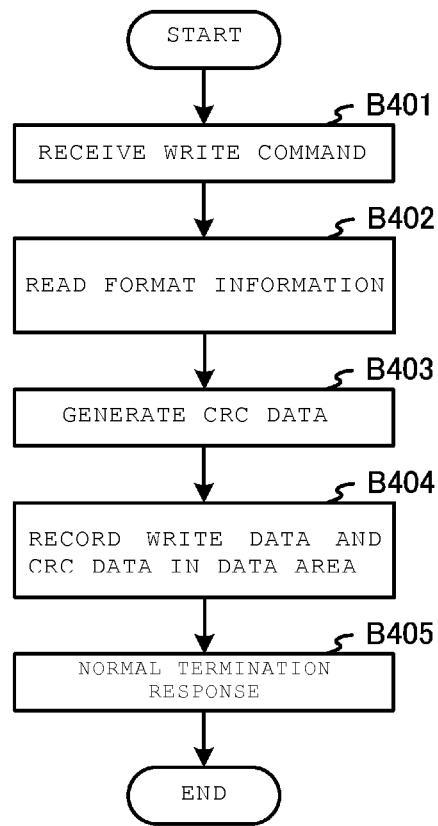
FIG. 4 is a flowchart for describing operation of writing according to the embodiment.

Next, by using FIG. 4, operation of writing that is executed in the HDD according to the embodiment will be described. FIG. 4 is a flowchart for describing the operation of writing according to the embodiment.

As described earlier, writing according to the embodiment is executed in response to a command transmitted from the host device 100 or a request issued in the HDD 10. In the flowchart shown in FIG. 4, writing that is executed in response to a write command transmitted from the host device 100 will be described. Writing is executed as a result of the CPU 41 controlling the HDA and the circuit block of the HDD 10 in accordance with the program product.

As described by using FIG. 3, after the execution of formatting according to the embodiment, the updated format information (more specifically, the format identification information) is recorded in the system area of the magnetic disk 1. By referring to the format identification information recorded on the magnetic disk 1, information about the executed formatting can be obtained on a sector-by-sector basis. Therefore, according to the embodiment, writing based on the information about formatting for each sector can be executed.

First, in response to reception of a write command with write data from the host device 100 (B401), the command processing section 201 notifies the writing section 202 of a request for execution of writing. Next, the writing section 202 reads the format information recorded on the magnetic disk 1 (B402). As described earlier, the format information is recorded in the system area of the magnetic disk 1. Incidentally, the reading section 203 may be used for reading the format information. The writing section 202 generates CRC data in which the read format information (more specifically, the format identification information) and a logical address (LBA) corresponding to each sector of the data area are embedded in a restorable manner by logical operation (B403). Then, the writing section 202 records, in each sector of the data area, data that is the write data to which the generated CRC data is added (B404). When the writing section 202 notifies the command processing section 201 of the completion of processing, a normal termination command for the write command is transmitted to the host device 100 (B405).

In this way, writing according to the embodiment is executed. According to this writing, the format identification information and the LBA corresponding to the sector on which recording is performed are added to the CRC data. Therefore, the presence or absence of execution of formatting for each sector and correctness of an LBA to be processed can be determined later with no loss of the sector format efficiency of the data area. That is, with the information recording device and the information recording method according to the embodiment, writing for suitably performing formatting of an area provided for recording the user data of the magnetic disk 1 therein can be executed.

Figure 5:
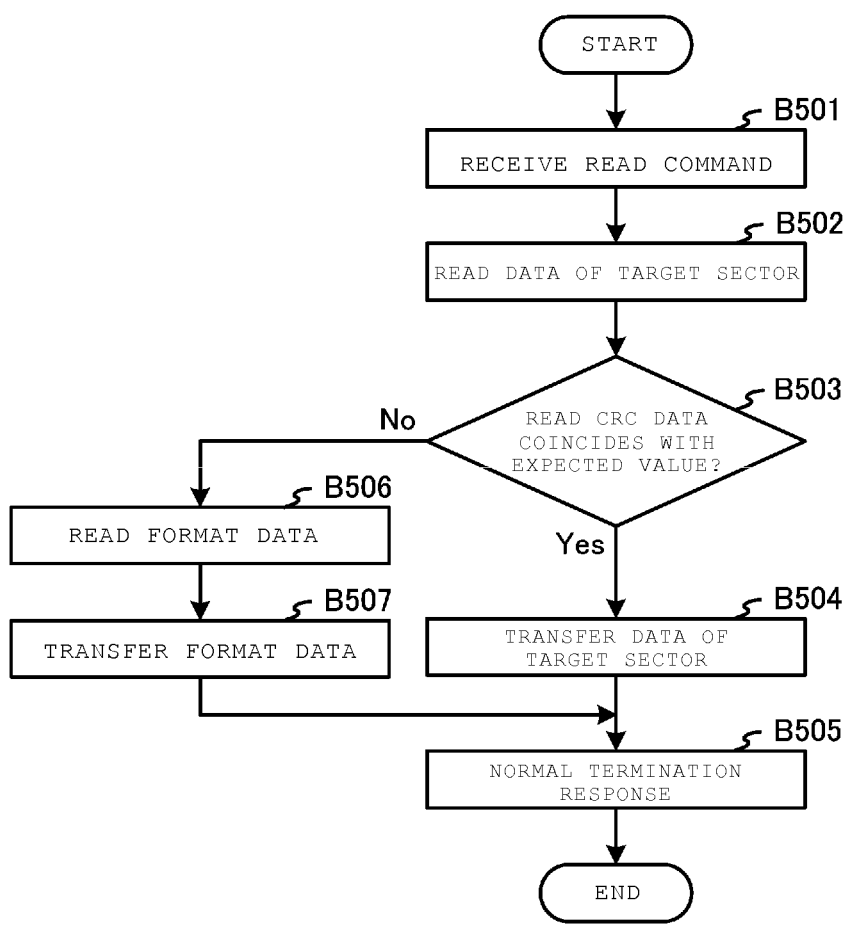
FIG. 5 is a flowchart for describing operation of reading according to the embodiment.

Next, by using FIG. 5, operation of reading that is executed in the HDD according to the embodiment will be described. FIG. 5 is a flowchart for describing the operation of reading according to the embodiment.

As described earlier, reading according to the embodiment is executed in response to a command transmitted from the host device 100 or a request issued in the HDD 10. In the flowchart shown in FIG. 5, reading that is executed in response to a read command transmitted from the host device 100 will be described. Reading is executed as a result of the CPU 41 controlling the HDA and the circuit block of the HDD 10 in accordance with the program product.

As described by using FIG. 3, after the execution of formatting according to the embodiment, the updated format information (more specifically, the format identification information) is recorded in the system area of the magnetic disk 1. By referring to the format identification information recorded on the magnetic disk 1, information about the executed formatting can be obtained on a sector-by-sector basis. Therefore, according to the embodiment, reading based on the information about formatting for each sector can be executed.

First, in response to reception of a read command including information about an LBA to be processed from the host device 100 (B501), the command processing section 201 notifies the reading section 203 of a request for execution of reading. Next, the reading section 203 reads data recorded in a target sector of the data area of the magnetic disk 1, the target sector corresponding to the LBA to be processed (B502). The read data includes user data and CRC data. The reading section 203 determines whether or not the CRC data included in the read data coincides with an expected value (B503). In other words, the reading section 203 examines the CRC data included in the read data. This determination (examination) can be implemented by comparing the format identification information and the LBA that are restored from the CRC data read from the target sector with the format information recorded in the system area and the LBA to be processed. That is, as the expected value, the format information recorded in the system area and the LBA to be processed or the CRC data based on such information is used. In addition to the above-described method, other methods may be adopted as a method for determining (examining) whether or not the read CRC data coincides with the expected value.

If the reading section 203 determines that the CRC data included in the read data coincides with the expected value (Yes in B503), the reading section 203 transfers the data read from the LBA to be processed to the command processing section 201 as read data (B504) and notifies the command processing section 201 of the completion of processing. In response to the notification of the completion of processing, a normal termination command for the read command is transmitted to the host device 100 (B505).

On the other hand, if the reading section 203 determines in B503 that the CRC data included in the read data does not coincide with the expected value (No in B503), the reading section 203 reads the format data recorded in the system area (B506). Then, the reading section 203 transfers the format data read from the system area to the command processing section 201 as read data (B507) and notifies the command processing section 201 of the completion of processing. Also in this case, in response to the notification of the completion of processing, a normal termination command for the read command is transmitted to the host device 100 (B505).

In this way, reading according to the embodiment is executed. According to this reading, by examining CRC data read from an LBA to be processed, the format data can be transferred even when the read data is not correct data. That is, with the information recording device and the information recording method according to the embodiment, reading for suitably performing formatting of an area provided for recording the user data of the magnetic disk 1 therein can be executed.

According to the embodiment described above, formatting, writing, and reading are executed as a result of the HDA and the circuit block provided in the HDD 10 being controlled in accordance with the program product that is executed in the CPU 41. That is, with the information recording device and the information recording method according to the embodiment, formatting of an area provided for recording the user data of the magnetic disk 1 therein can be suitably performed and writing and reading for suitably performing the formatting can be performed.

While the above-described embodiment deals with the HDD 10 as an example of the information recording device, the embodiment may be applied to devices (for example, an SSD and a memory card) using nonvolatile semiconductor memory (for example, NAND memory, MRAM, or FeRAM) as a recording medium and devices, such as an optical disk drive and a magneto-optical disk drive, that record information on a recording medium.

Moreover, in addition to the embodiment described above, the following modified examples may be adopted. For example, the format information may be recorded in a nonvolatile recording section such as the NVRAM 43, not in the system area of the magnetic disk 1. Furthermore, when format identification information and an LBA are embedded in CRC data in a restorable manner, in place of the LBA, cylinder/head/sector (CHS) information recorded in each servo area may be used. In addition, in formatting, logical and physical address management information for managing the correlation between the physical address of the data area of the magnetic disk 1 and the logical address (LBA) transmitted from the host device 100 may be invalidated. The logical and physical address management information is included in the format information. Moreover, formatting, writing, and reading may be requested as internal processing of the HDD 10 instead of being requested from the host device 100.

In addition to these modified examples, when formatting during which the format data changes to another data is requested, by recording the format identification information and the format data in the system area (the nonvolatile recording section) after bringing the format identification information and the format data into correspondence with each other, format data for each LBA to be processed can be transferred to a source of request in response to a subsequent read request. Moreover, formatting according to the embodiment can be applied not only to processing in an environment in which the user uses the HDD 10 after shipment thereof, but also to processing in a production process of the HDD 10. As a result, the time required for the production process of the HDD 10 can be reduced.

That is, with the information recording device and the information recording method to which the above-described embodiment (and the modified examples thereof) is applied, the speed of the execution of formatting can be further increased. As a result of the speed of the execution of formatting being increased, tolerance to external perturbations (for example, vibration and impact and a change in the temperature or humidity) to the HDD 10 can be expected to be improved. Moreover, during writing after the execution of formatting according to the embodiment, formatting and reading which will be executed later can be suitably executed with no loss of sector format efficiency. Furthermore, during reading after the execution of formatting according to the embodiment, requested data can be suitably transferred to a source of request.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:
1. An information recording device comprising:
   a recording medium that includes a data area;
   a recording unit that records data on the recording medium; and a controller that controls recording of the data on the recording medium by the recording unit, wherein, in response to a request for execution of formatting of the data area of the recording medium, the controller does not record data for the formatting in the data area and records format information about the formatting in a nonvolatile recording area that is different from the data area.

2. The information recording device according to claim 1, wherein the format information includes identification information for identifying data for the formatting.

3. The information recording device according to claim 1, further comprising:

an interface unit that controls transmission and reception of a command and data between the information recording device and a host device, wherein the request for execution of formatting is a command that requests execution of formatting, the command being transmitted from the host device via the interface unit.

4. The information recording device according to claim 1, wherein the nonvolatile recording area is a system area on the recording medium that is provided for recording management information about recording of the data by the controller.

5. The information recording device according to claim 1, wherein in response to a write request for writing data into a target sector of the data area, the controller records, in the target sector, the format information and data of the write request.

6. The information recording device according to claim 5, wherein the controller generates CRC data that embeds the format information and records the CRC data.

7. The information recording device according to claim 6, wherein in response to a read request for reading data recorded in a target sector of the data area, the controller examines whether CRC data recorded in the target sector contains format information that coincides with the format information recorded in the nonvolatile recording area, and if coincidence is not found, the controller returns the format information recorded in the nonvolatile recording area.

8. The information recording device according to claim 7, wherein if coincidence is found, the controller returns data of the read request.

9. The information recording device according to claim 8, wherein the CRC data and the data of the read request are both recorded in the target sector.

10. The information recording device according to claim 6, wherein the controller executes a logical operation to embed the format information in the CRC data.

11. An information recording method carried out in an information recording device including a recording medium that includes a data area, and a controller that controls recording of data on the recording medium, the information recording method comprising:

in response to a request for execution of formatting of the data area of the recording medium, not recording data for the formatting in the data area; and recording format information about the formatting in a nonvolatile recording area that is different from the data area.

12. The information recording method according to claim 11, wherein the format information includes identification information for identifying data for the formatting.

13. The information recording method according to claim 11, wherein the information recording device further includes an interface unit that controls transmission and reception of a command and data between the information recording device and a host device, and the request for execution of formatting is a command that requests execution of formatting and the command is transmitted from the host device via the interface unit.

14. The information recording method according to claim 11, wherein the nonvolatile recording area is a system area on the recording medium that is provided for recording management information about recording of the data by the controller.

15. The information recording method according to claim 11, further comprising:

in response to a write request for writing data into a target sector of the data area, recording, in the target sector, the format information and data of the write request.

16. The information recording method according to claim 15, further comprising:

generating CRC data that embeds the format information and recording the CRC data.

17. The information recording method according to claim 16, further comprising:

in response to a read request for reading data recorded in a target sector of the data area, examining whether CRC data recorded in the target sector contains format information that coincides with the format information recorded in the system information recording area, and if coincidence is not found, returning the format information recorded in the system information recording area.

18. The information recording method according to claim 17, further comprising:

if coincidence is found, returning data of the read request.

19. The information recording method according to claim 18, wherein the CRC data and the data of the read request are both recorded in the target sector.

20. The information recording method according to claim 19, wherein the format information is embedded in the CRC data by a logical operation.

* * * * *